Nov. 18, 1969   E. C. LENTZ   3,479,145
EXHAUST SYSTEM
Filed Sept. Filed May 19, 1965   3 Sheets-Sheet 1
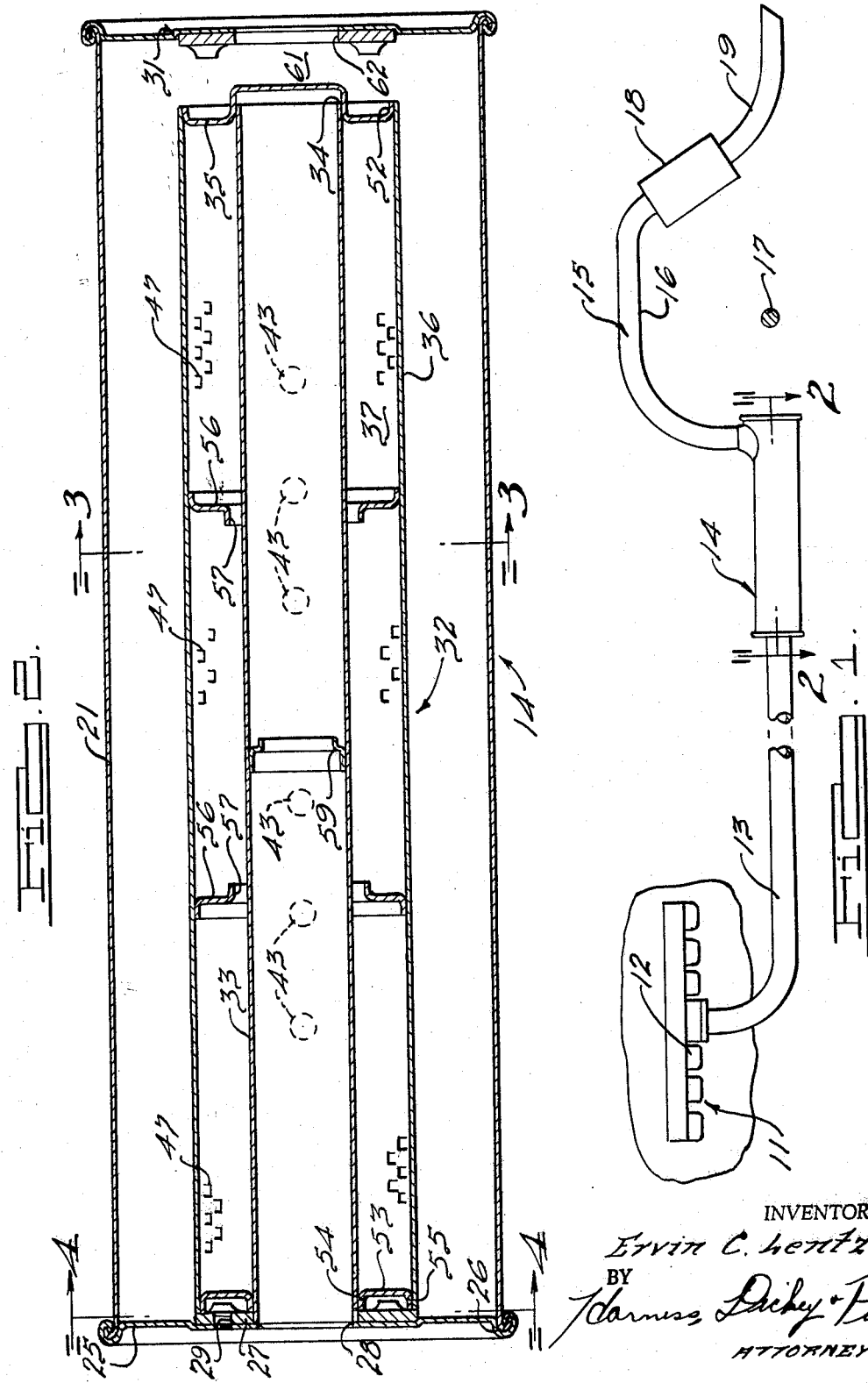
INVENTOR
Ervin C. Lentz.
BY
Harness, Dickey & Pierce
ATTORNEYS.

Nov. 18, 1969     E. C. LENTZ     3,479,145
EXHAUST SYSTEM
Filed May 19, 1965
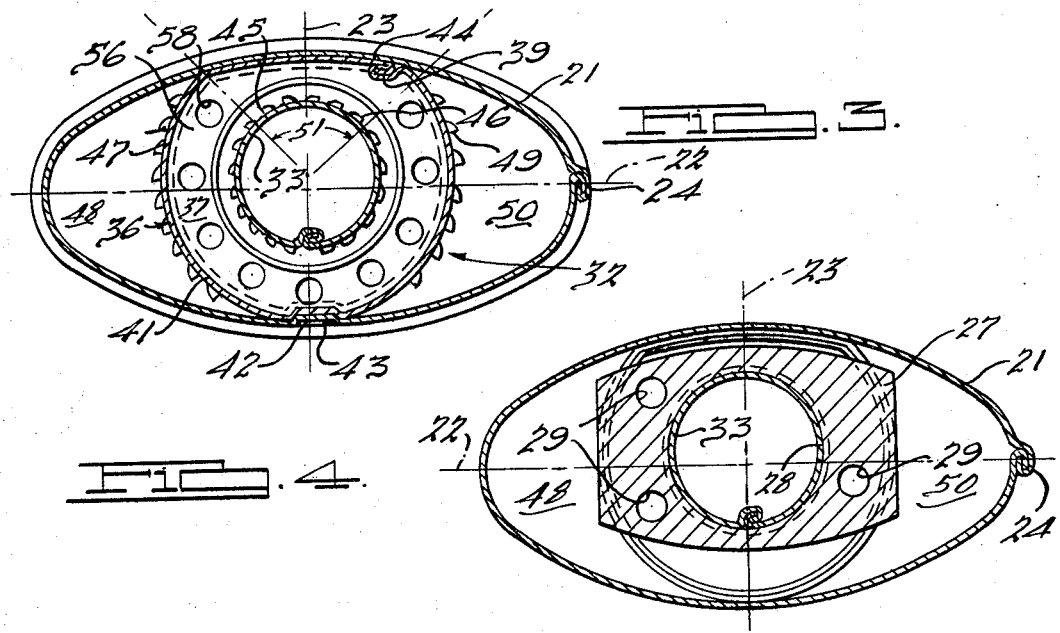
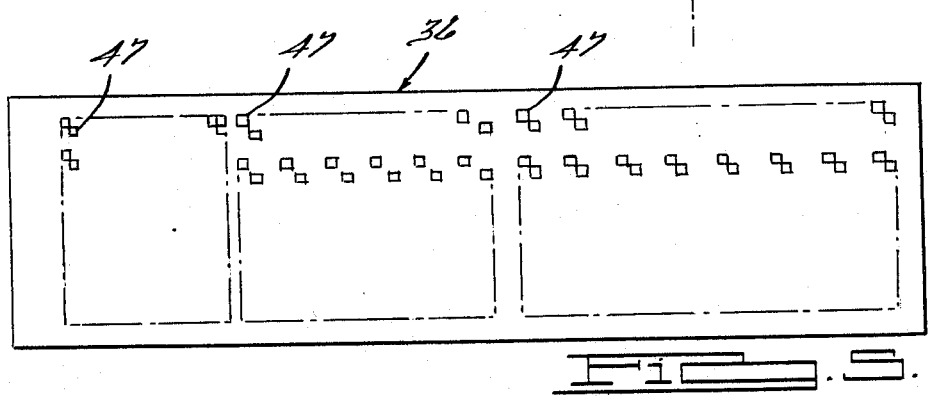
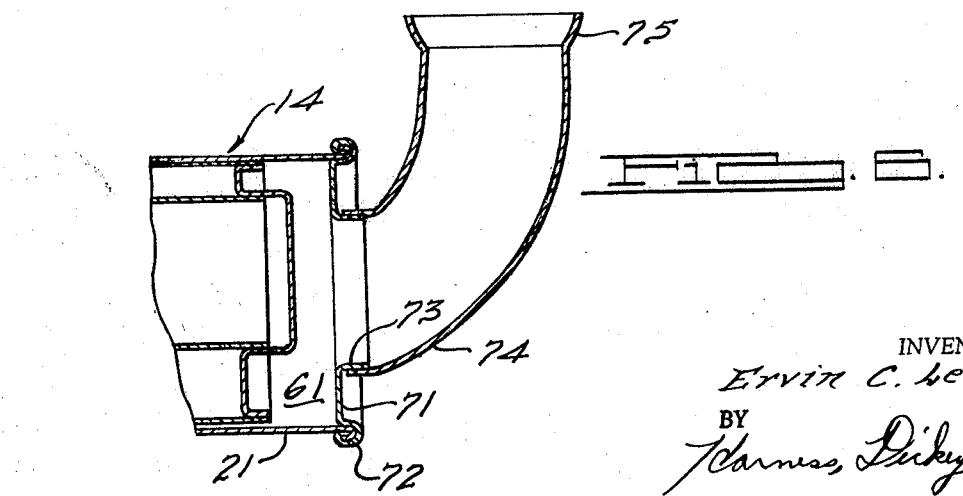
INVENTOR.
Ervin C. Lentz
BY
Harness, Dickey & Pierce
ATTORNEYS.

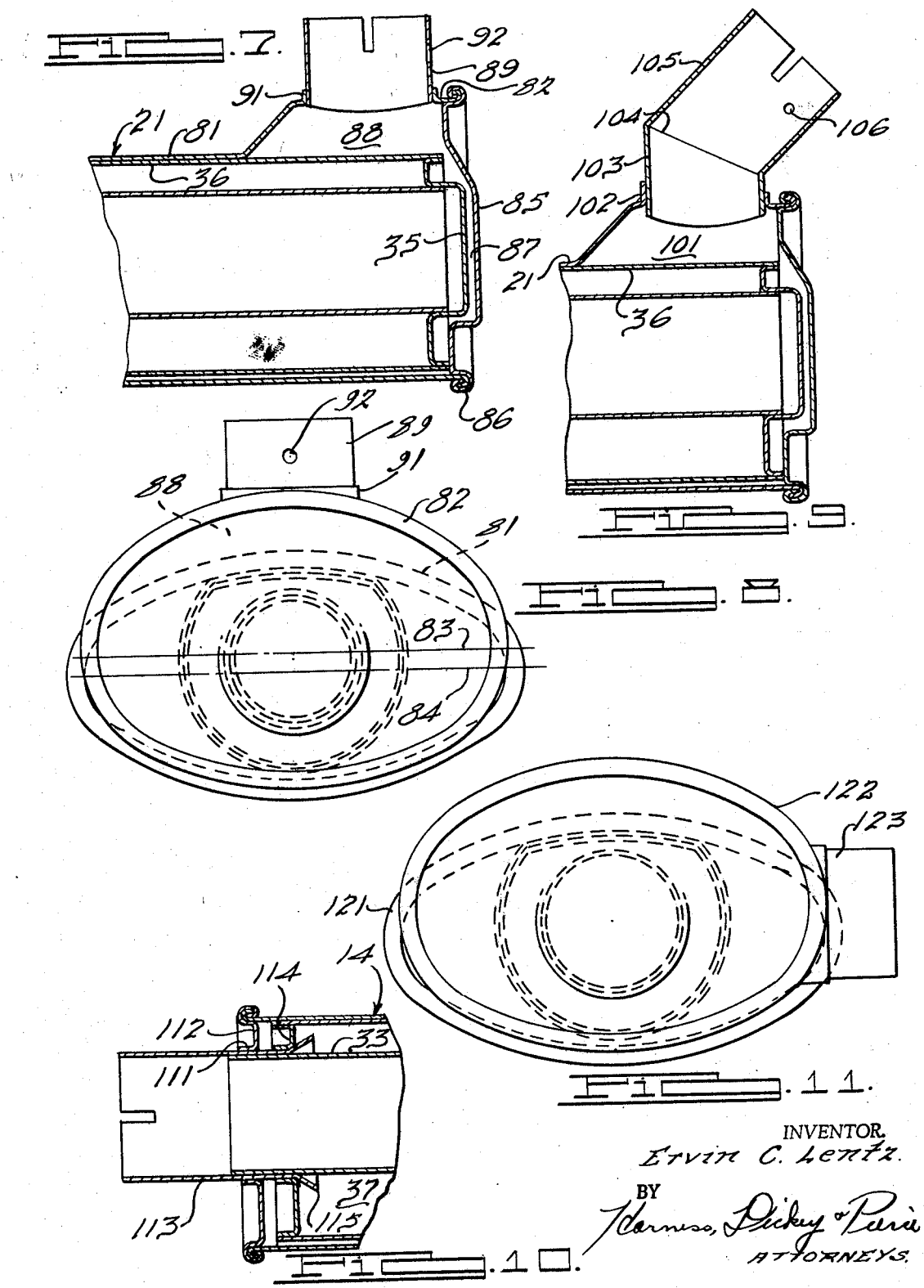

United States Patent Office 3,479,145
Patented Nov. 18, 1969

3,479,145
EXHAUST SYSTEM
Ervin C. Lentz, Jackson, Mich., assignor to Walker Manufacturing Company, a corporation of Delaware
Filed May 19, 1965, Ser. No. 457,097
Int. Cl. B01j 9/04
U.S. Cl. 23—288                13 Claims

ABSTRACT OF THE DISCLOSURE

A low profile catalytic converter has an oval outer housing and a pair of concentric inner cylindrical members which define a radial flow catalyst bed having an axis displaced upwardly from the housing axis and including an oval segment contacting a segment of the oval housing.

---

This invention relates to an exhaust system for an internal combustion engine and more particularly to an exhaust system embodying an improved catalytic converter.

In certain areas there has been considerable interest in reducing the amount of unburned hydrocarbons and other air pollutants emitted to the atmosphere from the exhaust of internal combustion engines. It has been proposed to embody a catalytic device in the exhaust system of automotive vehicles to reduce the amount of pollutants discharged to the atmosphere from the vehicle through reaction of the exhaust gases. A catalytic converter for the exhaust system of an internal combustion engine should reduce the pollutants to an acceptable level and should have a long life. It must, however, be of sufficiently small size to fit conveniently beneath the vehicle and preferably should be versatile enough for use on a wide variety of vehicles. Since the catalytic converter is otherwise an additional element in the exhaust system, it is most desirable if it can replace the conventional muffler.

It is, therefore, a principal object of this invention to provide an exhaust system embodying a catalytic converter that will effectively attenuate substantially all of the audible exhaust system noises without the necessity of providing a separate muffler.

It is a further object of this invention to provide a compact catalytic converter that may conveniently be positioned beneath the body of an automotive vehicle.

It is another object of this invention to provide a catalytic converter that is readily adaptable for use on a wide variety of different types of automotive vehicles.

The foregoing and other objects are accomplished by means of an exhaust system for an automotive vehicle that includes a catalytic converter. The catalytic converter is constructed and arranged to attenuate substantially all of the audible medium and high frequency exhaust sounds of the system. A resonator is provided in conjunction with the catalytic converter to attenuate the most objectionable sound frequencies that are not attenuated by the catalytic converter.

A catalytic converter embodying this invention comprises an outer shell having a substantially greater width than height. An exhaust gas inlet flange is provided at one end of the outer shell and an exhaust gas outlet flange is provided at the other end of the outer shell. A catalyst bed is supported within the outer shell along its length. The catalyst bed comprises an elongated inner support member in communication at one end thereof with one of the flanges. An elongated outer member is spaced from the inner member and defines a catalyst chamber therebetween. The members have a plurality of openings formed along their length so that exhaust gas may flow through a catalyst in the chamber in its path from the inlet flange to the outlet flange. Portions of the surface of the outer member at opposite sides thereof are spaced inwardly from adjacent portions of the surface of the outer shell to provide gas flow cavities therebetween. Another portion of the surface of the outer member is in engagement with a portion of the inner surface of the outer shell for a substantial area.

A muffler or a catalytic converter embodying another feature of this invention has an outer shell closed at each end by an end wall. Each of the end walls comprises a sheet metal member and a backing plate. An exhaust gas inlet is formed in one of the end walls through the sheet metal member and the backing plate and an exhaust gas outlet is formed in the other of the end walls extending through the sheet metal member and the backing plate. Means are provided on each of the end walls for attaching exhaust gas inlet and outlet flanges to them.

A muffler or catalytic converter embodying still another feature of the invention has an outer shell closed at each end by an end wall. An exhaust gas inlet flange is formed in one of the end walls and an exhaust gas outlet flange is former in the outer shell contiguous to the other end wall. The outer shell may be oval in shape and the exhaust gas outlet flange may lie on either the major or minor axis of the portion of the outer shell contiguous to the other end wall.

Other objects and advantages of this invention will become more apparent when considered in conjunction with the accompanying drawings, wherein:

FIGURE 1 is a partially schematic side elevational view of the exhaust system of an automotive vehicle embodying this invention;

FIGURE 2 is an enlarged cross-sectional view of the catalytic converter taken along the line 2—2 in FIGURE 1;

FIGURE 3 is a cross-sectional view taken along the line 3—3 in FIGURE 2;

FIGURE 4 is a cross-sectional view taken along the line 4—4 in FIGURE 2;

FIGURE 5 is a plan view showing the positioning of the louvers along the length of the catalyst bed of the converter shown in FIGURES 2–4;

FIGURE 6 is a cross-sectional view showing an embodiment of an exhaust gas flange that may be used with the catalytic converter;

FIGURE 7 is a partial cross-sectional view of another embodiment of an exhaust gas flange that may be used with the catalytic converter;

FIGURE 8 is an end view of the flange shown in FIGURE 7;

FIGURE 9 is a partial cross-sectional view of another embodiment of an exhaust gas flange which may be used with the catalytic converter;

FIGURE 10 is a partial cross-sectional view of another embodiment of an exhaust gas flange which may be used with the catalytic converter; and FIGURE 11 is a partial cross-sectional view taken in the same direction as FIGURE 8 showing still another embodiment of an exhaust gas flange.

Referring now in detail to the drawings, FIGURE 1 illustrates schematically an exhaust system for an automotive vehicle including an internal combustion engine 11 having a exhaust manifold 12. The exhaust manifold 12 is connected to the inlet end of an exhaust inlet pipe 13, the outlet end of which is connected to the inlet side of a catalytic converter, indicated generally by the reference numeral 14 and shown in more detail in the remaining figures. A pipe 15 having a kickup 16 to clear a rear axle 17 of the vehicle is connected to the outlet end of the catalytic converter 14. The outlet end of the pipe 15 is connected to the inlet side of a resonator 18 that terminates in a tailpipe section 19. The system shown in FIGURE 1 is intended to reduce the amount of air pollutants discharged to the atmosphere by the engine 11 and may include several or all of the features disclosed in the copending application entitled "Exhaust System," Ser. No. 393,623, filed Sept. 1, 1964 in which I am a co-inventor with Kark K. Kerns and Robert N. Balluff, which application is assigned to the assignee of this application.

Referring now in detail to FIGURES 2 through 4, the catalytic converter 14 comprises an outer shell 21 that has a generally oval cross-section in planes taken normal to its longitudinal axis as shown in FIGURE 3. The ovals of the cross-sections have a common major axis 22 and minor axis 23 in this embodiment. Preferably, the converter 14 is positioned with the major axis 22 extending in a horizontal direction and the minor axis 23 extending in a vertical direction. The width of the outer shell 21 in the direction of the major axis 22 is substantially greater than its height along the minor axis 23. This construction permits the converter to be compact and conveniently located beneath the body (not shown) of an automotive vehicle. In one form of the invention, the dimension along the major axis may be 7¾ inches and the dimension along the minor axis may be 4 inches. Thus, the width is approximately two times the height. The outer shell 21 may be formed from a single piece of sheet metal that is joined by a lock seam 24.

The forward or inlet end of the outer shell 21 is closed by an end wall that includes a sheet metal end member 25 that is secured around its periphery to the outer shell 21, as by a flange or lock seam 26. A more rigid backing plate 27 may be affixed to the inner side of the end member 25. As seen in FIGURE 4, the backing plate 27 is generally rectangular in shape. A circular aperture 28 is formed in the end member 25 and the backing plate 27 to provide an exhaust gas inlet for the catalytic converter 14. Three tapped holes 29 are formed in the backing plate 27 and corresponding apertures are formed in the end member 25. The tapped holes 29 permit an exhaust gas inlet flange of any desired shape to be attached to the forward end of the catalytic converter 14. A rear end wall assembly 31, that is substantially identical to the front end wall assembly, also is provided. Since the rear end wall assembly is identical to the front end wall with the exception of being symmetrically opposite, it will not be described in detail. It will be noted, however, that the rear end wall assembly also provides attaching means so that an exhaust gas outlet flange (not shown) may be attached to the outlet end of the convertor 14. Since attaching means are provided for suitable flanges at each end of the convertor, it should be readily apparent that convertor 14 may be used in any of a wide variety of different types of automotive vehicles by substituting the appropriate inlet and outlet flanges.

A catalyst bed, indicated generally by the reference numeral 32, extends substantially the full length of the outer shell 21 and is supported therein. The catalyst bed 32 comprises a cylindrical inner support tube 33 that may be formed from a single piece of sheet metal closed by a lock seam (FIGURES 3 and 4). The forward end of the inner support tube 33 is received with a press fit within the aperture 28 in the backing plate 27 of the front wall and is supported thereby. Thus, the inlet end of the inner support tube 33 is in fluid communication with the exhaust gas inlet end of the convertor 14. The opposite ends of the inner support tube 33 is received in a cylindrical embossment 34 of a sheet metal end cap 35. The outer end of the tube 33 is slidably received within the embossment 34 to permit relative movement due to different thermal expansions, as will become apparent as this description proceeds.

An outer sheet metal support member 36 extends around the inner support tube 33 throughout its length to define an annular catalyst chamber 37 therebetween. The outer support member 36 may be closed by a lock seam 39. Referring to FIGURE 3, it will be noted that the outer support member 36 has a generally cylindrical section 41 that extends around a major portion of the circumference of the inner support tube 33 concentric therewith. The cylindrical section 41 and inner support tube 33 have their common longitudinal center disposed above the major axis 22 of the outer shell 21 on the minor axis 23. The cylindrical section 41 is substantially tangent to the inner surface of the outer shell 21 at the lower side of its minor axis 23. It should be noted that the catalyst chamber 37 is annular in the portion between the cylindrical section 41 and the inner support tube 33 whereby a uniform depth of catalyst may be provided in this area. The outer shell 21 is provided with a plurality of longitudinally spaced embossments 42 along its length on the minor axis 23. Apertures 43 may be provided within the center of the embossments 42 so that the lower edge of the outer support member 36 may be affixed, as by welding, to the outer shell 21 for support thereby.

The opposing ends of the cylindrical section 41 of the outer support member 31 are connected by a section 44 that is complementary in shape to the inner surface of the oval outer shell 21 adjacent to the minor axis 23 and in contact therewith over a substantial area. The lock seam 39 may be positioned within this area.

The inner support tube 33 is provided with a plurality of downwardly facing fine flat louvers 45 on one side of the minor axis 23 and similarly shaped downwardly facing louvers 46 on the other side of the minor axis 23.

One side of the cylindrical section 41 is provided with a plurality of downwardly facing flat louvers 47 that open to an elongated chamber 48 formed between the left hand side of the inner periphery of the outer shell 21 and the adjacent surface of the outer support member 36. Similar downwardly facing louvers 49 are provided on the opposite side of the outer support member 46 that open to an elongated chamber 50 provided between the outer surface of the support member 36 and the adjacent surface of the outer shell 21. A portion of the outer support member 36, including the section 44, included in an angle designated at 51 in FIGURE 3, is unlouvered.

As has been previously noted, the inner support tube 33 is received in a cylindrical embossment 34 of the end cap 35 to provide a seal therebetween. The outer periphery of the end cap has an outturned flange portion 52 that is spot welded at circumferentially spaced locations to the outer end of the outer support member 36 to form a closure for the outer end of the catalyst cavity 37. A forward end cap 53 has a cylindrical outturned flange 54 that is spot welded around its periphery to the forward end of the inner support tube 33. An outturned flange 55 of the end cap 53 has a shape that is complementary to the forward end of the outer support member 36 and is spot welded thereto to complete the forward enclosure for the catalyst cavity 37. A pair of reinforcing flanges 56 may be positioned at spaced locations along the length of the outer support member 36 within the catalyst cavity 37. The flanges 56 have enlarged central apertures 57 so that they will not restrict significantly the flow of gas through the cavity 37. The flanges 56 also are provided with a plurality of apertures 58 (FIGURE 3) therein to further reduce the flow restriction.

Exhaust gas from the engine enters the catalytic convertor 14 through the exhaust gas inlet flange that is attached to its inlet end. The exhaust gases enter the inlet end of the inner support tube 33. The gases enter the catalyst cavity 37 through the louvers 45 and 46 in the inner support tube 33. Since it is desirable to have a uniform gas flow through all portions of the catalyst that is contained within the cavity 37 to prevent localized hot spots and channeling, the louvers 45 and 46 are more widely spaced at the inlet end of the inner support tube 33 than they are at the downstream end, as best seen in FIGURE 5.

It has been found that a uniform gas flow may be accomplished by providing three groups of louvers having different spacing. A short group of louvers adjacent to the inlet end are closely spaced and a long group of louvers adjacent the outlet end are widely spaced. An intermediate group of louvers having an intermediate spacing is positioned between the closely spaced louvers and the widely spaced louvers. The intermediate group extends for a length that is between the lengths of the closely spaced and widely spaced louvers. Although the longitudinal spacing of the louvers varies, all of the louvers are uniformly spaced in a circumferential direction.

In one embodiment, ten rows of equally spaced louvers were provided at a length of five inches along the inlet end of the inner support tube 33. Twelve rows of the same size louvers were equally spaced along the next eight inches of the inner support tube 33. Sixteen rows of the same size louvers were equally spaced along the remaining twelve inches of the inner support tube 33. If necessary, a flow restrictor 59 may be positioned in the center of the inner support tube 33 to aid in the flow equalization.

The exhaust gas flows radially through the catalyst within the cavity 37 and is discharged from the louvers 47 and 49 in the outer support member 36. Since there are no louvers in the area included between the angle 51, very little exhaust gas will flow through the catalyst within this area and it will, therefore, function as a catalyst reservoir. As the catalyst within the remainder of the cavity 37 becomes depleted, catalyst will fall from the reservoir area into the active area of the cavity 37.

The exhaust gas leaving the catalyst bed 32 enters the longitudinal chambers 48 and 50 at each side of the bed. The exhaust gas then flows longitudinally to an outlet cavity 61 that is formed between the rear end cap 35 and the end wall assembly 31. The exhaust gas is discharged from the convertor 14 through an outlet opening 62 formed in the end wall 31. The outlet opening 62 communicates with any suitable exhaust gas flange (not shown).

The catalytic converter 14 will additionally function as a muffler to attenuate high frequency sound waves emanating from the engine 11 and a portion of the medium frequency sound waves. The convertor 14, therefore, may function with the resonator 18 to provide substantially complete silencing for the engine 11. The resonator 18 is tuned to reduce the amplitude of the most objectional mode of vibration of the low frequency sound waves emanating from the engine 11. It also will attenuate all harmonics of this mode, of course.

In some automotive applications, as typified by the schematic illustration in FIGURE 1, it is desirable to position the catalytic convertor 14 toward the rear of the vehicle directly in front of the rear axle 17. In these instances the outlet flange that is attached to the rear end wall assembly 31 of the convertor 14 should be disposed in an upward direction so that the pipe 15 having the kick-up 16 may be directly attached thereto without the provision of an additional bend in the pipe 15. A suitable outlet flange having such a configuration may be attached to the rear end wall 31. Alternatively, the catalyst convertor 14 may be provided with an integral flange that is disposed in this position as shown in the embodiments of FIGURES 6 through 9.

Referring first to the embodiment of FIGURE 6, the outer shell 21 of the convertor 14 has a rear end plate 71 that is fixed around its outer periphery to the outer shell 21 as by a rolled-over lock seam 72. The central portion of the rear end plate 71 is provided with an outturned cylindrical flange 73 onto which an angularly disposed tubular member 74 is welded or otherwise fixed. The tubular member 74 is formed with a radius and extends upwardly from the convertor 14. A spherical end portion 75 is provided at the upper end of the tubular member 74 for attachment to a flange (not shown), that will provide a ball and socket type connection to an exhaust outlet pipe.

In the embodiment shown in FIGURE 6, the exhaust gas from the longitudinal passages at each side of the convertor 14, also merged into the cavity 61 positioned immediately forward of the rear end wall 71. The length of the convertor 14 may be reduced by eliminating at least partially the cavity 61. The embodiment shown in the remaining figures accomplishes this result.

Referring now in detail to the embodiment shown in FIGURES 7 and 8, the outer shell 21, which had a uniform oval cross sectional shape along the major portion of its length in the other embodiments, is provided with a first oval portion 81 that is of the same shape as that described in the previous embodiments and contacts the upper and lower surfaces of the outer support member 36 in the manner previously described. The rear end of the outer shell 21 is gradually blended into a second section 82 that has a lesser dimension along its major axis and a greater dimension along its minor axis than the section 81. The major axis 83 of the oval section 82 is also displaced upwardly from the major axis 84 of the section 81 (FIGURE 8) although the minor axes are coincident. The oval sections 81 and 82, however, are tangent or coincident along their lower surface so that the lower surface of the outer support members 36 will be contacted along its full length.

An end plate 85 is affixed to the rear end of the outer shell 21 as by a rolled-over lock seam 86. It will be noted that a small clearance 87 is provided between the end cap 35 of the catalyst bed and the end plate 85 to permit relative thermal expansion. The exhaust gases which flow longitudinally along the sections at each side of the converter 14 merge in the enlarged oval section 82 on the upper portion of the outer support member 36 in the cavity identified by the reference numeral 88 in the drawings. An outlet flange 89 is welded to an up-turned flange 91 that is concentrically disposed upon the minor axis of the oval section 82. A hole 92 is drilled through the flange 89 so that a muffler clamp having a locating pin (not shown) may be positioned around the flange 89 to secure a tailpipe to it. The locating pin is necessary, because the force of gravity will be acting upon the rear end of the converter 14 tending to separate it from the exhaust pipe.

In some instances it may be desirable to have the outlet flange of the muffler disposed at an angle to the vertical. The embodiment shown in FIGURE 9 accomplishes this result. In this embodiment, the outer shell 21 is provided with two different shaped oval sections as in the embodiment of FIGURES 7 and 8 and these will not be described again. A cavity 101 is provided above the outer support member 36 at the rear end of the outer shell 21. A vertically extending flange 102 is provided in the outer shell 21 above the cavity 101 along the minor axis of the outer shell 21. A first outlet flange pipe 103 is welded around its periphery to the flange 102. The outlet pipe flange 103 is cut off at an angle 104, the exact location and disposition of which may suit the particular application. A second outlet flange pipe 105 is also cut off at a corresponding angle and is welded around its periphery to the pipe 103. A hole 106 is drilled into the outer end of the pipe 105 so that a muffler clamp having a locating pin (not shown) may be utilized to affix an outlet pipe to the upper end of the outlet flange pipe 105.

In the embodiment shown in FIGURE 10, the inner support tube 33 extends through a flange 111 formed in the front end plate 112. An inlet flange, in the form of a tubular member 113 extends between the flange 111 and the forward end of the inner support pipe 33 into the catalyst cavity 37. The tubular member 113 is spot welded around its periphery to the flange 111 and a flange 113 formed in a front end plate 114 that encloses the catalyst cavity 37. An out-turned funnel shaped portion 115 may be provided on the inner end of the tubular member 113. The reinforcing plate shown in the embodiment of FIGURES 2 through 5 may be eliminated in the embodiment shown in FIGURE 10 since the exhaust inlet flange is formed integrally with the converter 14. It is to be understood that the flange shown in FIGURE 10 also may be used as an exhaust outlet flange for the converter 14. In such an embodiment, however, the inner support tube 33 would not extend into the exhaust flange since the exhaust end inner tube 33 is closed.

In some instances it may be desirable to have one or both of the exhaust gas flanges of the converter 14 disposed in the outer shell 21 at a horizontal position rather than in a vertical direction as shown in FIGURES 6 through 9. FIGURE 11 illustrates such an embodiment.

Referring now in detail to FIGURE 11, the outer shell 21 is provided with two different shape oval sections 121 and 122 as in the embodiments of FIGURES 7 through 9. Although a cavity is provided in the section 122 above the rear end of the outer support member 36 as in the embodiments of FIGURES 7 through 9, this cavity is not the exhaust gas discharge cavity. The cavity, however, permits exhaust gas to flow from the longitudinal chamber at one side of the converter 14 across through the cavity to the chamber at the other side. An exhaust gas flange 123 is formed in the chamber at this side so that the exhaust gases may be discharged in a horizontal direction from the side of the outer shell.

It is be understood that the embodiments shown and described are exemplary only of preferred forms the invention may take and that other changes and modifications may be made without departing from the spirit and scope of the invention, as defined by the appended claims.

What is claimed is:

1. A low profile catalytic convertor for use in the exhaust system of an internal combustion engine comprising an elongated outer shell having a generally oval cross sectional shape along longitudinal sections thereof, an exhaust gas inlet flange at one end of said outer shell, an exhaust gas outlet flange at the other end of said outer shell, and a generally annular catalyst bed supported within said outer shell, said catalyst bed comprising a cylindrical inner support tube extending through a major portion of the length of said outer shell, one end of said inner support tube being in communication with one of said exhaust gas flanges, an elongated outer support member disposed around said inner support tube to define a catalyst chamber therebetween, said outer support member having substantially cylindrical segments concentrically disposed around said inner support tube on opposing sides thereof to define a uniform thickness portion of the catalyst chamber therebetween, said cylindrical segments of said outer member being joined at at least one end thereof by a partially oval section of said outer member having a shape complementary to a portion of said outer shell along its minor axis and in engagement therewith, and a plurality of apertures in said inner support tube and said outer support member for radial exhaust flow through the catalyst contained within said catalyst chamber.

2. A low profile catalytic convertor as set forth in claim 1 wherein the apertures in one of the inner support tube and outer support member are of uniform size along its length and are more closely spaced at one of its ends than at the other to promote uniform gas flow through the catalyst bed.

3. A low profile catalytic convertor as set forth in claim 1 wherein the oval section of the outer support member is substantially imperforate whereby the portion of the catalyst chamber between said oval section and the inner support tube functions as a catalyst reservoir.

4. A low profile catalytic convertor for the exhaust system of an internal combustion engine comprising an elongated outer shell having a generally oval cross sectional shape taken in planes transverse to the longitudinal axis thereof, end walls closing each end of said outer shell, first exhaust gas flange means formed in one of said end walls, a catalyst bed including an elongated inner support tube supported by said outer shell and being in communication at one end thereof with said first exhaust gas flange means, means closing the other end of said inner support tube, an elongated outer support member disposed around said inner support tube to define a catalyst chamber therebetween, said outer support member having a substantially cylindrical segment concentrically disposed around said inner support tube to define a uniform thickness portion of said catalyst chamber therebetween, said cylindrical segment being in substantially tangential abutment with said outer shell along its minor axis on one side thereof and being spaced inwardly from said outer shell adjacent its major axis, the ends of said cylindrical segment being joined by a section of said outer member having a shape complementary to a portion of said outer shell along the other side of said minor axis and in engagement therewith, said outer member and said outer shell thereby defining two longitudinally extending spaced outlet chambers on opposite sides of said convertor, a plurality of apertures in said inner support tube and in said outer support member for radial exhaust flow through the catalyst contained within said catalyst chamber, an exhaust gas chamber formed between said outer support member, said outer shell and the other of said end walls for joining said longitudinally extending chambers, and second exhaust gas flange means communicating with said exhaust gas chamber.

5. A low profile catalytic convertor as set forth in claim 4 wherein the oval section of the outer member is substantially imperforate whereby the portion of the catalyst chamber between said oval section and the inner support tube function as a catalyst reservoir.

6. A low profile catalytic convertor for the exhaust system of an internal combustion engine comprising an elongated outer shell having first and second longitudinally extending portions having generally oval cross-section shapes taken in planes transverse to the longitudinal axis of said convertor, said first portion having a smaller dimension along its minor axis and a greater dimension along its major axis than said second portion, end walls closing each end of said outer shell, first exhaust gas flange means formed in one of said end walls, a catalyst bed including an elongated inner support tube supported by said outer shell and being in communication at one end thereof with said first exhaust gas flange means, means closing the other end of said inner support tube, an elongated outer support member disposed around said inner support tube to define a catalyst chamber therebetween, said outer support member having a substantially cylindrical segment concentrically disposed around said inner support tube to define a uniform thickness portion of said catalyst chamber therebetween, said cylindrical segment being in substantially tangential abutment with said outer shell along its minor axis on one side thereof and being spaced inwardly from said first portion of said outer shell along its major axis and in engagement therewith along the other side of its minor axis, said outer member and said outer shell thereby defining two longitudinally extending spaced outlet chambers on opposite sides of said convertor, a plurality of apertures in said inner support tube and said outer support member for radial exhaust flow through the catalyst contained within said catalyst chamber, at least a part of said second portion of said outer shell being spaced from said outer support member along its minor axis to form an exhaust gas chamber for joining said longitudinally extending chambers, and second exhaust gas flange means communicating with said exhaust gas chamber.

7. A low profile catalytic convertor as set forth in claim 6 wherein the second exhaust gas flange means is formed in the second portion of the outer shell on its minor axis.

8. A low profile catalytic convertor as set forth in claim 6 wherein the second exhaust gas flange means is formed in the second portion of the outer shell on its major axis.

9

9. A low profile catalytic convertor as set forth in claim 6 wherein the minor axes of the first and second portions of the outer shell are coincident, the major axis of said second portion is displaced from the major axis of said first portion an amount sufficient to form a continuous edge of the outer shell along its lower surface, and the outer support member contacts the outer shell along a major portion of the length of said continuous edge.

10. A low profile catalytic convertor for use in the exhaust system of an internal combustion engine comprising an oval shaped elongated outer shell having a substantially greater width than height and having a longitudinal axis, an exhaust gas inlet at one end of said outer shell, an exhaust gas outlet at the other end of said outer shell, and an annular catalyst bed supported within said outer shell and having a longitudinal axis substantially parallel to the shell axis and lying in substantially the same vertical plane as said shell axis but displaced vertically from it, said catalyst bed comprising an elongated inner tubular support member in communication at one end thereof with said inlet, an elongated tubular outer member substantially concentric with and spaced from said inner member and defining a catalyst chamber therebetween to provide said catalyst bed, said members having a plurality of openings formed along their length for exhaust flow through the catalyst in said chamber between said inner and said outer members, said outer member being substantially circular but having a flattened top portion of substantial width, opposite sides of the outer member being spaced inwardly from adjacent portions of the sides of said outer shell, the flattened top portion of the outer member being in engagement with a portion of the inner surface of said outer shell along the length of the outer member.

11. A low profile catalytic convertor as set forth in claim 10 wherein the outer member is in engagement with a portion of the inner surface of the outer shell on the side thereof opposite to top portion.

12. A low profile catalytic convertor as set forth in claim 10 wherein the top portion of the surface of the outer member is in engagement with an upper surface of the outer shell and substantially no perforations are formed in one of the members in the area adjacent to said another surface whereby the volume between the inner and outer members adjacent to said another portion serves as a catalyst reserve chamber.

13. A convertor as set forth in claim 10 wherein said gas outlet extends transversely to said longitudinal axis in the direction of the height of the shell.

References Cited

UNITED STATES PATENTS

| | | | |
|---|---|---|---|
| 1,366,632 | 1/1921 | Carlen. | |
| 1,822,990 | 9/1931 | Gorsline. | |
| 1,858,637 | 5/1932 | McDonald. | |
| 2,018,084 | 10/1935 | Oldberg. | |
| 3,041,149 | 6/1962 | Houdry | 23—288 |
| 3,090,677 | 5/1963 | Scheitlin et al. | 23—288 |
| 3,154,387 | 10/1964 | Wright | 23—288 |
| 3,154,388 | 10/1964 | Purse | 23—288 |
| 3,186,807 | 6/1965 | Bolek | 23—288 |
| 3,290,121 | 12/1966 | Malkiewicz | 23—288 |

FOREIGN PATENTS

| | | |
|---|---|---|
| 439,766 | 12/1935 | Great Britain. |
| 644,734 | 5/1937 | Germany. |

JOSEPH SCOVRONEK, Primary Examiner

U.S. Cl. X.R.

181—61, 72